United States Patent [19]

Lawsing

[11] Patent Number: 4,482,091
[45] Date of Patent: Nov. 13, 1984

[54] TEMPERATURE SENSOR

[75] Inventor: Joseph W. Lawsing, Windsor Locks, Conn.

[73] Assignee: United Technologies Corporation, Hartford, Conn.

[21] Appl. No.: 453,200

[22] Filed: Dec. 27, 1982

[51] Int. Cl.³ ............................................. G05D 27/00
[52] U.S. Cl. ................................. 236/92 R; 137/375; 251/335 B
[58] Field of Search ............... 236/99 R, 99 D, 92 R; 137/375; 251/335 B

[56] References Cited

U.S. PATENT DOCUMENTS

| 1,751,688 | 3/1930 | Eggleston | 236/99 D |
| 1,882,803 | 10/1932 | Giesler | 236/99 D X |
| 1,952,683 | 3/1934 | Resek et al. | 236/99 R |
| 1,979,109 | 10/1934 | Johnsson | 236/99 D |
| 3,166,248 | 1/1965 | Fleer | 236/99 D X |
| 3,937,244 | 2/1976 | Bible et al. | 236/99 R X |
| 4,271,859 | 6/1981 | Lawsing | 137/85 |
| 4,273,150 | 6/1981 | Paduch et al. | 137/85 |

FOREIGN PATENT DOCUMENTS 568247  6/1923  France ............................ 251/335 B Primary Examiner—William E. Tapolcai
Attorney, Agent, or Firm—John Swiatocha

[57] ABSTRACT

A temperature sensor includes a probe (15) accommodating a charge gas the pressure of which is a function of the temperature thereof, and a number of bellows (65, 75 and 85) or similar pressure responsive devices disposed in a chamber (12) which is thermally isolated from the charge gas. The chamber includes a jacket (150) through which a fluid such as gas turbine engine fuel flows to insulate the pressure responsive devices from ambient temperatures.

8 Claims, 1 Drawing Figure

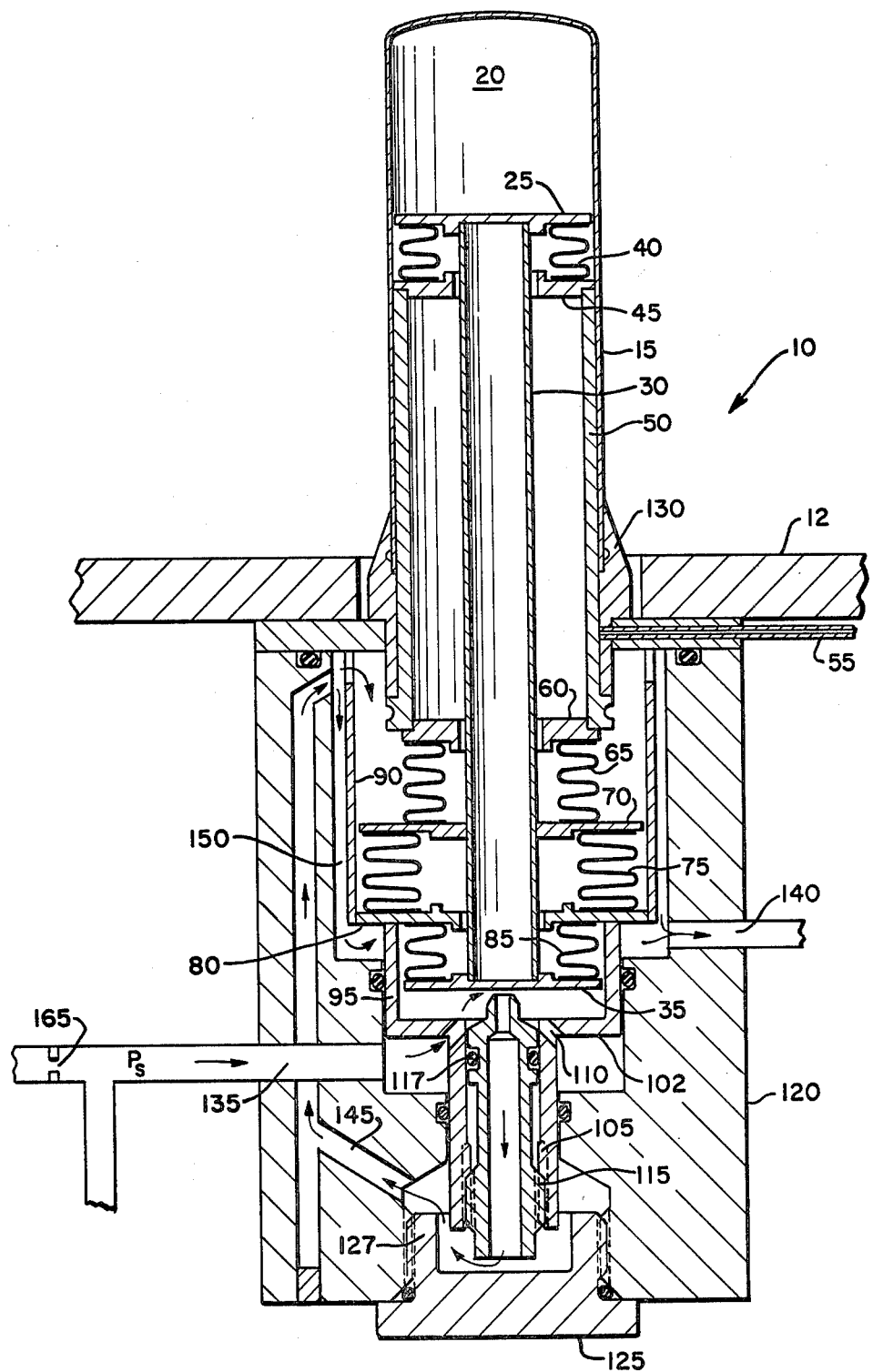

TEMPERATURE SENSOR

DESCRIPTION

Technical Field

This invention relates in general to temperature sensors and more particularly to temperature sensors for use in measuring the temperature of airflow through a gas turbine engine.

Background Art

It is a well known practice to control fuel flow to a gas turbine engine at least in part on the basis of the temperature of air which supports combustion in the engine. A known type of temperature sensor employed for such measurements utilizes a quantity of charge gas at the location (for example, in an air inlet duct) where it is desired to measure temperature, the charge gas pressure varying as a first order function of absolute temperature at that location. Typically, the charge gas communicates with a bellows or similar pressure responsive device in a remote chamber through a tube or similar conduit, movement of the bellows in response to pressure changes in the charge gas being indicative of changes in charge gas pressure and, therefore, temperature at the location in question. Such bellows movement may be employed to indicate the measured temperature or alternatively, may directly control a function such as the fuel flow to the engine.

While such temperature sensors have proven adequate for certain applications thereof, impovements to such sensors such as in the accuracy thereof are continuously sought. It has been found that certain aspects of the structure of such prior art temperature sensors deleteriously affects the accuracy thereof. One such aspect is the manner in which the charge gas communicates with the bellows (or other pressure responsive device). As noted hereinabove, heretofore, it has often been the practice to provide a tubular connection between the charge gas at the location at which the temperature is to be measured and the bellows. Frequently, such a tube traverses locations at temperatures which differ from that which is to be measured, such differing temperatures affecting the temperature indicative pressure of the charge gas and thus, introducing what are known as cross-ambient temperature errors into the operation of the sensor. Furthermore, variations in the ambient temperature experienced by the bellows and causing differential and/or uniform thermal expansions thereof, further contribute to errors in the output of the device.

In addition to the hereinabove noted limitations in the accuracy of prior art temperature sensors, it is continually sought to improve the accuracy of such sensors by minimizing the hysteresis characteristics of the components thereof as well as to simplify the construction of the device and hence the cost thereof.

Disclosure of Invention

It is therefore a principle object of the present invention to provide an improved temperature sensor which overcomes the deficiencies of the prior art.

It is another object of the present invention to provide an improved temperature sensor characterized by enhanced accuracy due to a minimization of errors resulting from cross-ambient temperatures acting on a charge gas employed therein.

It is another object of the present invention to provide such a temperature sensor characterized by enhanced accuracy due to a minimization of errors in the operation thereof resulting from ambient temperatures experienced by fluid pressure responsive devices employed therein.

It is another object of the present invention to provide such a temperature sensor characterized by a minimization of errors in the operation thereof resulting from the hysteresis characteristics associated with the movable components thereof.

It is yet another object of the present invention to provide such a temperature sensor characterized by enhanced simplicity and economy of structure and manufacture.

These and other objects are attained by the temperature sensor of the present invention which, according to one aspect thereof, employs a probe enclosing a charge gas the pressure of which being a first order function of the temperature thereof such that the charge gas is essentially thermally isolated from any fluid pressure responsive components employed by the sensor to minimize errors in the operation thereof. According to another aspect of the present invention, bellows employed by the sensor serve to control the pressure of a fluid such as gas turbine engine fuel which flows through a jacket surrounding the bellows to minimize errors in sensor operation due to differential thermal expansion of the bellows resulting from variations in the ambient temperature thereof. The temperature sensor employs no levers or other pivoting members or sliding seals wherein errors in the operation of the sensor due to hysteresis (friction) characteristics of the contituent components thereof are minimized.

BRIEF DESCRIPTION OF THE DRAWING

The sole FIGURE is a sectioned side elevation of a preferred embodiment of the temperature sensor of the present invention.

Best Mode for Carrying Out the Invention and Industrial Applicability

Referring to the drawing, the temperature sensor of the present invention is shown generally at 10 mounted, for example, through the sidewall 12 of a duct or other enclosure, the temperature of the interior of which is desired to be measured. Sensor 10 comprises a probe 15 having a reservoir 20 at the end thereof, the reservoir being filled with a charge gas such as argon or helium, the pressure of which is a function (such as a first order function) of absolute temperature at the location of the probe tip. The pressurized charge gas ("first fluid") acts on flat piston or header 25 to which at the center thereof is secured tubular shaft ("connecting means") 30 having secured at the opposite end thereof another flat piston or header 35. Fluid pressure responsive bellows 40 are secured to the underside of piston 25 allowing downward movement of the piston in response to pressurization of the charge gas in reservoir 20 and providing a restoring force to piston 25 when the pressure in reservoir 20 is lowered. Bellows 40 are secured at the lower end thereof to an annular mount 45 within probe 15, the mount being secured to the end of a thin walled tube 50 which is slip fit within probe 15, a slight clearance between the probe walls and tube 50 communicating with charging capillary 55 through which reservoir 20 is filled with gas. The lower end of tube 50 has secured thereto a second mounting member 60 to which one end of pressure responsive bellows 65 is secured. The opposite end of bellows 65 is secured to flat piston or header 70 secured to tubular shaft 30. Header 70 has pressure responsive bellows 75 secured to the underside thereof. The lower end of bellows 75 is secured to annular mount 80 having bellows 85 secured to the underside thereof, bellows 85 at the opposite end thereof being secured to piston 35. As shown, mount 80 extends radially inwardly from the lower portion of cylindrical sleeve 90 and the upper portion of cylindrical sleeve 95, forming a junction therebetween. Sleeve 90 includes passages 100 at the upper portion thereof. Sleeve 95 includes a generally flat bottom portion 102 and, extending downwardly therefrom a threaded portion 105, the juncture of bottom portion 102 and threaded portion 105 being provided with apertures 110 therein. A threaded nozzle 115 is secured within tubular portion 105, and sealed thereto by O-ring 117. As illustrated, sleeve 90, mount 80 and sleeve 95 with floor 102 and tubular portion 105 may be all secured together as by welding, to form a unitary structure.

With the exception of probe 15 and the components received therewithin, the components described hereinabove are all received within hollow chamber 120 sealed at the bottom thereof by plug 125 and secured to probe 15 and mounted on wall 12 as by mount 130. The chamber includes an inlet passage 135 leading to the interior of the chamber and a drain passage 140 providing an outlet therefrom. As shown, inlet passage 135 communicates with that portion of the chamber below floor portion 102 and, through apertures 110, to that portion of the chamber immediately below piston 35. The chamber also includes a second conduit 145 communicating with the lower end of nozzle 115 at the end of plug 125 and, through apertures 100, with the interior of the chamber. As illustrated, the chamber interior extends radially, outwardly of sleeve 90, defining therewith an annular jacket 150 which surrounds the interior of the chamber.

Operation of the temperature sensor is as follows: The sensor is placed in a conduit such as a gas turbine engine air inlet duct, so that the location of the tip of probe 15 at reservoir 20 corresponds to the location at which it is desired to measure the temperature of fluid within the duct. As the gas within reservoir 20 heats and cools, it expands and contracts thereby moving piston 25 and hence, hollow shaft 30 and piston 35. As set forth hereinabove, bellows 40 accommodates displacements of piston 25 and provides a restoring force thereto while sealing the charge gas from the interiors of thin walled tube 50 and shaft 30 which are evacuated. It will be seen that such displacement of piston 25 adjusts the spacing between piston 35 and the upper end of nozzle 115. A second (supply) fluid, (for example, gas turbine engine fuel) is fed to the area between piston 35 and the upper nozzle end through conduit 135, orifice 165 in conduit 135 lowering the pressure of the second fluid before it enters the sensor. As the spacing between piston 35 and the upper nozzle end is varied in response to temperature changes at reservoir 20, the pressure $P_S$ downstream of orifice 165 and upstream from the nozzle is varied accordingly, pressure $P_S$ constituting a fluid pressure signal indicative of the absolute temperature surrounding reservoir 20. In the event that it is desired to control the pressure $P_S$ rather than to use that pressure as a temperature indicating signal, it will be appreciated that variation in the spacing between piston 35 and nozzle 115 will effect such control, such as, for example, where it is desired to control fuel flow to the gas turbine engine in response to the temperature of air admitted thereto.

Supply fluid flows through nozzle 115, through second conduit 145 and through jacket 150. Supply fluid flowing through the jacket surrounds and thermally insulates bellows 65, 75 and 85 to maintain those bellows at a uniform temperature whereby errors in sensed temperature due to differential thermal expansion of these bellows are minimized. Fluid also flows through apertures 100 in sleeve 90 to that portion of the upper surface of piston 70 radially outwardly from bellows 65. This pressure urges piston 70 downwardly, compensating for the upward biasing of piston 35 by fluid pressure against the lower face thereof. Accordingly, it will be seen that the area of piston 70 outwardly of bellows 65 should closely approximate the overall surface area of piston 35. Fluid is exhausted from chamber 120 through jacket 150 and drain passage 140.

As set forth hereinabove, the elongate configuration of probe 15 minimizes the risk of the temperature of charge gas 20 being influenced by temperature within the boundary layer adjacent wall 12. The evacuation of shaft 30, and thin walled tube 15, as maintained by bellows 40, 65, 75 and 85 as well as the thinness of the walls of shaft 30 and tube 50 minimize the introduction of errors in the operation of the probe due to thermal conduction through the chamber and probe to reservoir 20. Utilization of bellows exclusively rather than other forms of movable seals such as sliding seals as well as a lack of pivoting connections between movable members in the sensor minimizes inaccuracies due to hysteresis. Surrounding the components of the sensor interiorly of chamber 120 with supply fluid maintains these components at a uniform temperature (that of the supply fluid) thereby minimizing inaccuracies due to differential thermal expansion of these components and also insulates these components from variations in ambient temperature at the exterior of chamber 120 to further minimize inaccuracies. Calibration of the sensor is easily achieved by removal of plug 125 and rotary adjustment of the nozzle in its threaded connection with tube 105.

While a particular embodiment of the present invention has been described and illustrated herein, it will be appreciated by those skilled in the art that various modifications may suggest themselves to those skilled in the art from the description and drawing herein, and it is intended by the appended claims to cover such modifications as fall within the true spirit and scope of this invention.

Having thus described the invention, what is claimed is:

1. A temperature sensor characterized by:
    a probe adapted for placement at a location the temperature of which is to be measured, said probe containing a reservoir of a first fluid and a first bellows responsive to the pressure of said first fluid; and
    a chamber portion thermally isolated from said probe and including therein:
    a valve comprising a first movable header connected to said first bellows and a stationary nozzle,
    means connecting said valve to said first bellows for operation thereby:
    a first conduit for channeling a second fluid through said valve, adjustments in the setting of said valve by said first bellows effecting corresponding adjustments in the pressure of said second fluid indicative of variations in said measured temperature;

a jacket in fluid communication with said valve, flow of said second fluid through said jacket maintaining said connecting means at a uniform temperature for minimization of differential expansion thereof and insulation thereof from variations in ambient temperature;

said chamber portion including a second fluid conduit providing fluid communication between said nozzle at an outlet thereof and said jacket; and a second movable header fixed to said connecting means, said second header being in fluid communication with said second fluid conduit, said second fluid conduit channeling said second fluid to said second header for pressurization thereof in a direction opposite that of the pressurization of said first header.

2. The temperature sensor of claim 1 characterized by said connecting means including an elongate shaft.

3. The temperature sensor of claim 2 characterized by said shaft comprising a tubular member having an evacuated interior.

4. The temperature sensor of claim 1 characterized by said second header being pressurized by said second fluid at an outer surface thereof, said connecting means further including a third bellows, an inner surface of said second header and the interior of said chamber being sealed from said second fluid by said third bellows connected therebetween.

5. The temperature sensor of claim 1 characterized by said connecting means further including a fourth bellows, said second header being pressurized at a radially outer portion of said outer portion of said outer surface thereof, a radially inner portion of said outer surface and the interior of said probe being sealed from said second fluid by said fourth bellows connected therebetween.

6. The temperature sensor of claim 1 characterized by a third header attached to said connecting means and said first bellows at a first end thereof, said third header being pressurized at an outer surface by said first fluid.

7. The temperature sensor of claim 6 characterized by said probe interiorly of said third header being evacuated.

8. The temperature sensor of claim 6 characterized by said probe comprising a housing and a thin-walled tube disposed within said housing adjacent an inner surface thereof, said first bellows at a second end thereof being attached to said thin-walled tube, said probe being chargeable with said first fluid by the introduction thereof between said inner housing surface and said thin-walled tube.

* * * * *